US008064429B2

(12) United States Patent
Roberts et al.

(10) Patent No.: US 8,064,429 B2
(45) Date of Patent: Nov. 22, 2011

(54) METHOD FOR OPTIMIZING EXCHANGES OF INFORMATION ON ACKNOWLEDGEMENT IN ASYNCHRONOUS COMMUNICATION BETWEEN TERMINAL AND NETWORK

(75) Inventors: Michael Roberts, Neuilly sur Seine (FR); Frank Savaglio, Paris (FR)

(73) Assignee: NEC Corporation, Tokyo (JP)

( * ) Notice: Subject to any disclaimer, the term of this patent is extended or adjusted under 35 U.S.C. 154(b) by 990 days.

(21) Appl. No.: 11/887,991

(22) PCT Filed: Apr. 10, 2006

(86) PCT No.: PCT/JP2006/307988
§ 371 (c)(1),
(2), (4) Date: Oct. 5, 2007

(87) PCT Pub. No.: WO2006/109874
PCT Pub. Date: Oct. 19, 2006

(65) Prior Publication Data
US 2009/0061880 A1    Mar. 5, 2009

(30) Foreign Application Priority Data

Apr. 8, 2005    (FR) ...................................... 05 50911

(51) Int. Cl.
*H04B 7/216*    (2006.01)
*H04W 4/00*    (2009.01)
*H04W 36/00*    (2009.01)

(52) U.S. Cl. ......... 370/350; 370/329; 370/342; 455/442

(58) Field of Classification Search .......... 370/310–329, 370/338–350, 392–395; 455/501–515, 322–450; 709/224–242
See application file for complete search history.

(56) References Cited

U.S. PATENT DOCUMENTS

| 6,963,741 | B2 * | 11/2005 | Johansson et al. | 455/423 |
| 6,999,519 | B2 * | 2/2006 | Davies | 375/259 |
| 7,180,878 | B1 * | 2/2007 | Salonaho | 370/331 |
| 7,266,086 | B2 * | 9/2007 | Li | 370/252 |

(Continued)

FOREIGN PATENT DOCUMENTS

| CN | 1389047 A | 1/2003 |
| WO | WO 02/01803 A1 | 1/2002 |
| WO | WO 2005/109726 | 11/2005 |
| WO | WO 2006/020970 | 2/2006 |

OTHER PUBLICATIONS

Young-Gook Kim et al; "Network-Aware Error Control Using Smooth and Fast Rate Adapation Mechanism for TCP-Friendly Internet Video," Computer Communications and Networks, 2000. Preceeding, Ninth International Conference on Las Vegas, NV, USA Oct. 16-18, 2000, pp. 320-325.

(Continued)

*Primary Examiner* — Man Phan
(74) *Attorney, Agent, or Firm* — Scully, Scott, Murphy & Presser, P.C.

(57) ABSTRACT

In a method for optimizing exchanges of acknowledgement signals between a mobile equipment in asynchronous communication with a plurality of base stations of a cellular telecommunication network, the terminal sends data to the base stations and each base station is likely to return to the terminal a positive acknowledgement ACK or negative acknowledgement NACK. The method includes the steps of: synchronizing the mobile equipment with the network; and estimating quality of downlink communication between each base station and the mobile equipment on at least one standardized channel, such that if at least one base station returns an acknowledgement to the mobile equipment, the mobile equipment only requests a NACK from the base stations whilst the data is continuously being transmitted, and if all the base stations return a NACK to the mobile equipment, the mobile equipment only requests an ACK from the base stations during the current communication.

9 Claims, 4 Drawing Sheets

U.S. PATENT DOCUMENTS

| | | | |
|---|---|---|---|
| 7,346,035 B2* | 3/2008 | Lee et al. | 370/331 |
| 7,414,989 B2* | 8/2008 | Kuchibhotla et al. | 370/329 |
| 7,734,805 B2* | 6/2010 | Balachandran et al. | 709/232 |
| 2001/0055356 A1 | 12/2001 | Davies | |
| 2006/0034241 A1* | 2/2006 | Czaja et al. | 370/342 |
| 2006/0268883 A1* | 11/2006 | Qian et al. | 370/394 |
| 2007/0060167 A1* | 3/2007 | Damnjanovic et al. | 455/450 |
| 2008/0031168 A1* | 2/2008 | Bucknell et al. | 370/310 |
| 2008/0069028 A1* | 3/2008 | Richardson | 370/328 |
| 2009/0279512 A1* | 11/2009 | Fujishima et al. | 370/336 |

OTHER PUBLICATIONS

Noguchi T et al; "Reliable Multicast Protocol Applied Local FEC" ICC 2001. 2001 IEEE International Conference on Communications. Conference Record Relsinky, Finland, Jun. 11-14, 2001, IEEE International Conference on Communications, New York, NY: IEEE, US vol. 1 of 10, Jun. 11, 2001, pp. 2348-2353.

Chinese Office Action dated Apr. 8, 2010 with English language translation.

* cited by examiner

METHOD FOR OPTIMIZING EXCHANGES OF INFORMATION ON ACKNOWLEDGEMENT IN ASYNCHRONOUS COMMUNICATION BETWEEN TERMINAL AND NETWORK

TECHNICAL FIELD

The present invention is located in a field of telecommunications, and more specifically relates to the method for optimizing exchanges of acknowledgement signals between a mobile equipment such as a mobile terminal in asynchronous communication with a plurality of base stations of a cellular telecommunication network during which the mobile equipment sends data to the base stations and each base station is able to return a positive acknowledgement ACK to the mobile equipment if this base station receives correctly the data transmitted by the mobile equipment, or a negative acknowledgement NACK if it does not receive correctly the data transmitted by the mobile equipment.

The present invention also relates to mobile equipment capable of transmitting data to a plurality of base stations of a cellular telecommunication network and for receiving a positive acknowledgement ACK from a base station, if the data was all correctly received by the base station, or a negative acknowledgement NACK if the data was incorrectly received by the base station.

BACKGROUND ART

To allow mobile terminals to perform a high speed communication via cellular communication networks, the specifications of the group 3GPP (Third generation partnership project) adopt an architecture similar to that of the service HSDPA (High Speed Downlink Packet Access) to provide throughputs up to 2 Mbps (megabits per second) via an EUDCH (Enhanced Uplink Dedicated Channel) uplink channel or HSUPA (High Speed Uplink Packet Access) for future multimedia applications in UMTS (Universal Mobile Telecommunications System). In order to automatically control acknowledgement signaling between terminals and base stations, the specifications of the group 3GPP provide to add a supplementary protocol layer HARQ (Hybrid Automatic Request), at the level of the MAC (Media Access Control) sub-layer of layer 2 of the radio interface protocols.

The new protocol layer HARQ is provided to allow the base stations of the network to transmit positive acknowledgement signals ACK to the terminal if all the packets transmitted by the terminal are correctly received by base stations or a negative acknowledgement sign signal NACK if all the packets transmitted by the terminal are not correctly received by base stations. In case of a transmission fault, then the terminal has to coordinate itself with the network in order to re-transmit the packets.

Moreover, these specifications of the group of 3GPP provide that all the cells involved in a communication with the terminal send explicitly a positive acknowledgement ACK if the transmission is correct, which increases interferences at terminal level. In addition, as far as the number of NACK is about from 10% to 20% and the number of ACK represents 90%, it would be advantageous to provide a mechanism allowing base stations to get rid of emitting ACKs to the terminal when it is possible to deduce implicitly that the data were received.

In case of a synchronous communication in which a terminal and a network expect to receive data during a predetermined time TTI (Transmission Time Interval), exchanges of acknowledgement are optimized by the method described in French patent application No. 0550910 filed on the same day by the applicant and titled "procédé d'optimisation des échanges d'information d'accusé de réception dans une communication synchrone entre un terminal et un réseau (method for optimizing exchanges of information on acknowledgement in synchronous communication between a terminal and a network)".

In case of an asynchronous communication, base stations of a network do not expect to receive data during a predetermined time, and therefore will not be able to transmit to the terminal an acknowledgement indicating that the data was not received in case of a radio linkage problem between the terminal and the network. Then the terminal continues transmitting the data needlessly while they are not correctly received by the network.

DISCLOSURE OF THE INVENTION

A first object of the present invention is to allow base stations to detect a transmission error in an asynchronous communication.

A second object of the invention is to reduce the number of acknowledgement signals transmitted to mobile equipment such as a mobile terminal by base stations of a network.

Another object of the invention is to allow mobile equipment such as a mobile terminal to determine the type of acknowledgement that it needs from the analysis of its proper radio conditions.

These objects are achieved by means of a method for optimizing exchanges of acknowledgement signals between a mobile equipment in asynchronous communication with a plurality of base stations of a cellular telecommunication network during which the mobile equipment sends data to the base stations and each base station is likely to return a positive acknowledgement ACK to the mobile equipment if the base station receives the data transmitted by the mobile equipment correctly, or a negative acknowledgement NACK if the data transmitted by the mobile equipment was incorrectly received by the base stations.

The method according to the invention comprises the following steps of:

synchronizing the mobile equipment with the network; and estimating quality of downlink communication between each base station and the mobile equipment on at least one standardized channel, such that if at least one base station returns an acknowledgement to the mobile equipment, the mobile equipment only requests a negative acknowledgement NACK from the base stations whilst the data is continuously being transmitted, and if all the base stations return a negative acknowledgement NACK to the mobile equipment, the mobile equipment only requests a positive acknowledgement ACK from the base stations during the current communication.

According to the invention, if at least one base station returns a positive acknowledgement ACK to the terminal (i.e., the mobile equipment), the terminal requires only a negative acknowledgement NACK from the base stations during a current communication and, if all base stations return a negative acknowledgement NACK to the terminal, the terminal requires only a positive acknowledgement ACK from the base stations while data is continuously transmitted.

In a first variation of implementation of the method according to the present invention, the mobile equipment re-transmits the data only if estimated quality of all the channels is less than a predetermined value.

In a second variation, the mobile equipment re-transmits the data only if the estimated quality of at least one channel is less than a predetermined value and is all the other base stations send a negative acknowledgement NACK to the mobile equipment.

The invention is implemented by a mobile equipment such as for example a GSM (Global System for Mobile Communications) or UMTS telephone, capable of transmitting data to a plurality of base stations of a cellular telecommunication network and of receiving a positive acknowledgement ACK from a base station, if the data was correctly received by the base station, or a negative acknowledgement NACK, if the data was incorrectly received by the base station.

This mobile equipment includes:

means for estimating quality of downlink communication of each base station of the network on at least one standardized channel; and decision making means for either only requesting a negative acknowledgement NACK or only a positive acknowledgement ACK from the base stations depending on the quality of the estimated communication channel.

The present invention allows optimizing exchanges of the acknowledgement signals ACK and NACK between the mobile equipment and the base stations, thus reducing the interferences at mobile equipment level.

BEST MODE FOR CARRYING OUT THE INVENTION

The following description relates to an implementation of the present invention in a network based on the WCDMA (wideband code division multiple access) technology. More precisely, the invention will be described in a UMTS network.

In UMTS, the radio interface contains three main layers:
the physical layer (layer 1),
the data link layer (layer 2) and
the radio resource control (RRC) layer.
Layer 2 is composed of four sub-layers:
the MAC (Media Access Control) sub-layer,
the RLC (Radio Link) sub-layer,
the PDCP (Packet Data Convergence Protocol) sub-layer and
the BMC (Broadcast/Multicast Protocol) sub-layer.

The new protocol layer HARQ intended to control acknowledgement signaling between base stations and terminals is provided at MAC sub-layer level.

In UMTS, the network transmits permanently to a terminal in a current cell a primary code and a second code of synchronization respectively via a primary channel PSCH (Primary Synchronization Channel) and a secondary channel SSCH (Secondary Synchronization Channel) for identifying the neighboring UMTS cells, as well as a beacon channel called CPICH (Common Pilot Channel) for estimating pulse response of the propagation channel. The CPICH channel is composed of a predefined sequence of bits/symbols (so-called pilot) which are permanently transmitted over the cells. Throughput of these bits/symbols is constant and equal to 30 kbps (kilobits per second), that is 15 ksps (kilo-symbols per second). The CPICH channel is not associated with transportation channel. Contrary to a synchronous communication in which the base stations and the terminal know that during a TTI time (Transmission Time Interval) a transportation block will be exchanged, in an asynchronous communication, the base stations of the network do not know the timing at which the terminal starts transmitting the data. Also, a first phase of the method consists in synchronizing the terminal and the network.

Figure 1:
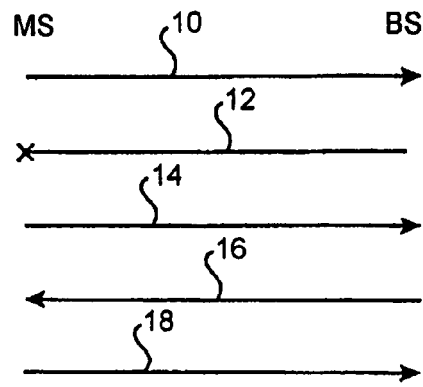
FIG. 1 is a schematic view illustrating a synchronizing phase of a terminal with a network.

FIG. 1 illustrates schematically the synchronizing phase of a mobile terminal MS and a base station BS of the network.

At step 10, the terminal MS sends to the base station BS the data packets accompanied with a request in which the terminal asks to the base stations to return to it a positive acknowledgement ACK at the end of a predetermined time D. If the terminal does not receive the ACK signal from the network (step 12), the terminal returns (step 14) the data and the request and estimates the quality of the link from the pulse response of the propagating channel measured in the CPICH channel. Upon receiving a positive acknowledgement ACK from at least one base station (step 16), the terminal returns (step 18) the data accompanied with a request in which the terminal asks to the base stations to only send negative acknowledgements NACK as far as the estimated quality of the link is higher than a predefined quality.

Figure 2:
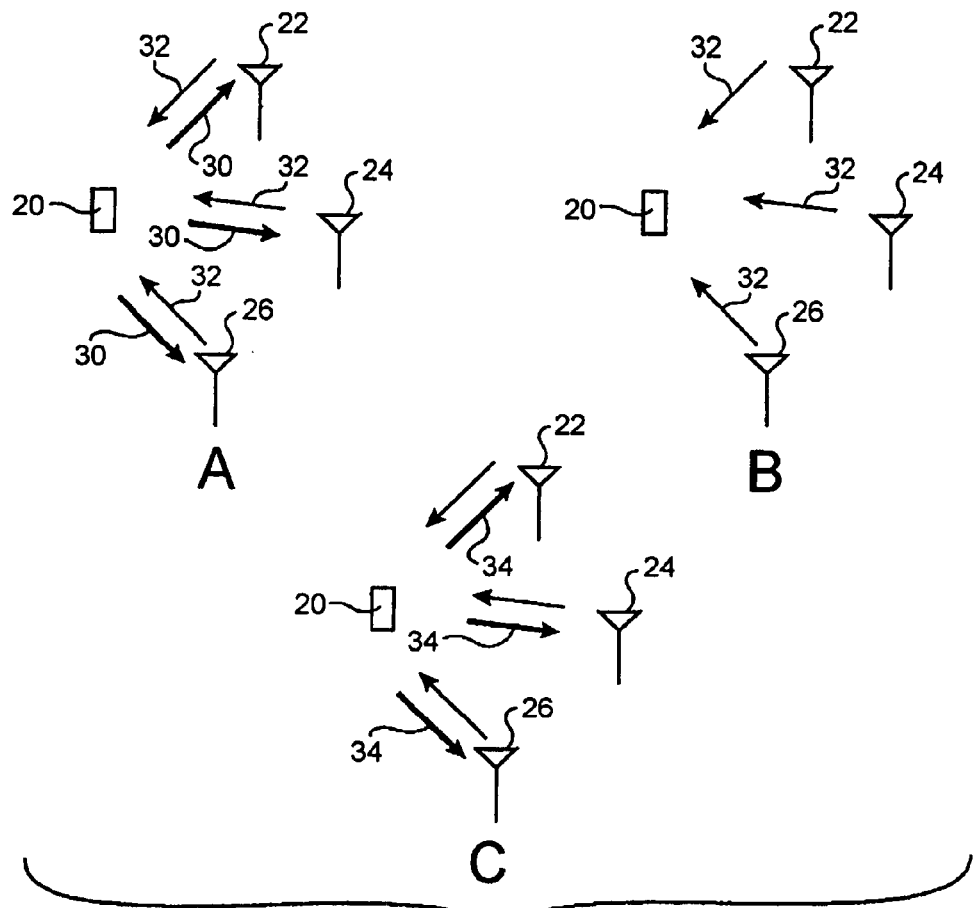
FIG. 2 is a schematic view illustrating a first situation in a network in which the method according to the present invention is implemented.

FIG. 2 illustrates schematically mobile terminal 20 in asynchronous communication with three base stations 22, 24 and 26 of the network. In the communication illustrated in FIG. 2, all the base stations received correctly the data transmitted by terminal 20.

In reference to FIG. 2A, after the synchronizing phase, terminal 20 sends (arrow 30) data packets to base stations 22, 24 and 26 and receives at the same time pilot bits/symbols from each of the base stations (arrow 32) via the CPICH channel.

In FIG. 2B, during the waiting time D of acknowledgement signals, terminal 20 determines power of the signals received from each base station 22, 24, 26 from the analysis of the bits/symbols transmitted via the CPICH channel, and compares the measured powers with a predetermined threshold power. If the power measured for each base station is higher than the threshold value, the terminal deduces that the transmitted packets were correctly received by base stations 22, 24 and 26 and sends (arrow 34, FIG. 2C) next packets without waiting for an ACK signal. Thanks to this mechanism, terminal 20 deduces an implicit ACK signal from the measurements made on the CPICH channel. Therefore, base stations 22, 24 and 26 are exempt from transmitting explicitly an ACK signal to the terminal. This allows power saving on a downlink, which can be allocated to another function.

Figure 3:
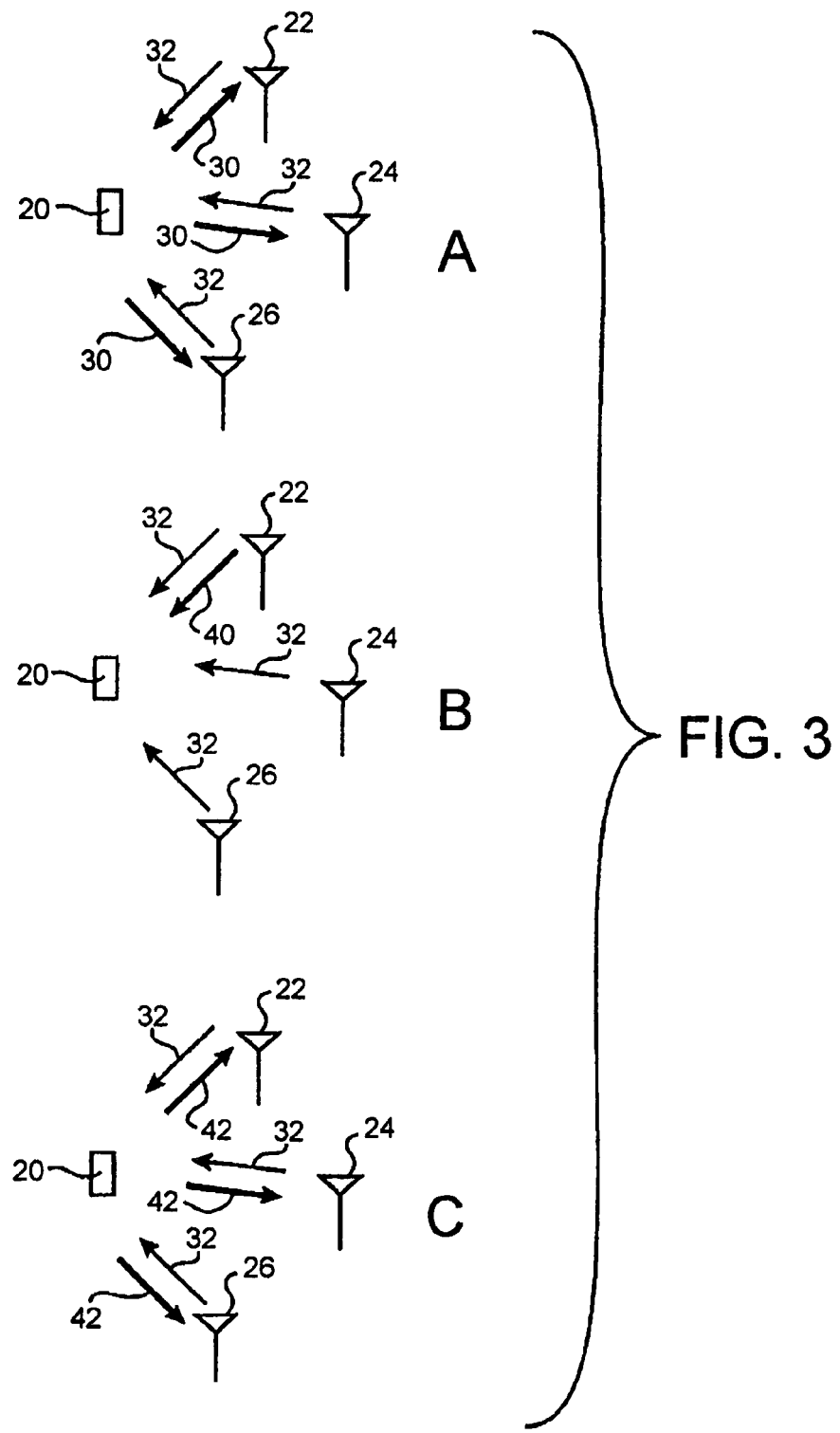
FIG. 3 is a schematic view illustrating a second situation in the network in which the method according to the present invention is implemented.

FIG. 3 illustrates schematically a second situation in which some base stations did not correctly receive the data transmitted by the terminal.

In reference to FIG. 3A, terminal 20 sends (arrow 30) data packets to base stations 22, 24 and 26 and receives at the same time pilot bits/symbols from each station (arrow 32) via the CPICH channel. In this case, base station 22 sends a NACK signal (arrow 40, FIG. 3B) to terminal 20. During the waiting time of acknowledgement signals, terminal 20 determines power of the signals received from each base station 22, 24, 26 from the analysis of the bits/symbols transmitted via the CPICH channel and compares the measured powers with the predetermined threshold power. If the power measured for each base station is higher than the threshold value, the decision module contained in terminal 20 deduces that the packets sent by terminal 20 were correctly received at least by base stations 24 and 26 and sends (arrow 42, FIG. 3C) next packets without waiting for an ACK signal and without taking into account the NACK signal (arrow 40) emitted by base station 22. Base stations 22, 24 and 26 continue sending (arrow 32) bits/symbols to the terminal via the CPICH channel.

The method according to the invention allows us to take into consideration in this case an attenuation of the signal emitted by base station 22 due physical conditions of transmission and to avoid retransmission of packets insofar as other base stations received correctly the packets emitted by the terminal.

Figure 4:
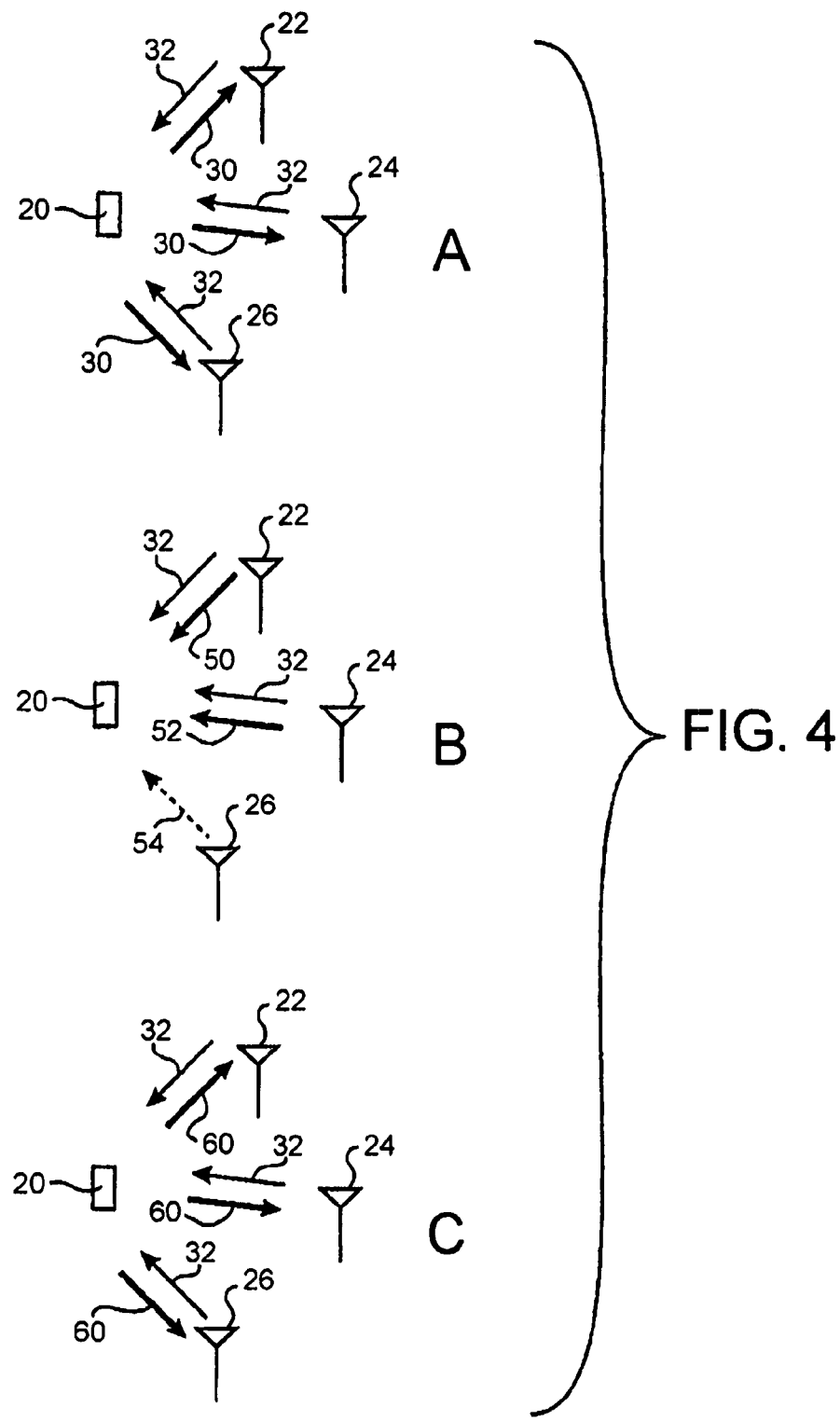
FIG. 4 is a schematic view illustrating a third situation in the network in which the method according to the present invention is implemented.

FIG. 4 illustrates schematically a third situation in which no base station received correctly the data transmitted by the terminal.

In reference to FIG. 4A, terminal 20 sends (arrow 30) data packets to base stations 22, 24 and 26 and receives at the same time pilot bits/symbols from each base station (arrow 32) via the CPICH channel. In this case, two base stations 22 and 24 send a NACK signal to terminal 20 (arrows 50 and 52, FIG. 4B). During the waiting time of acknowledgement signals, terminal 20 determines power of the signals received from each base station 22, 24, and 26 from the analysis of the bits/symbols transmitted via the CPICH channel and compares the measured powers with a predetermined threshold power. In this case, if the measured power of the signal received (arrow 54) from base station 26 is lower than the threshold value, the terminal deduces that none of base stations 22, 24 or 26 correctly received the packets sent by terminal 20. Terminal 20 returns (FIG. 4C) the same packets to the base stations (arrow 60) and carries out again measures on the signals transmitted by the base stations (arrow 32) via the CPICH channel. This operation will be repeated until at least one of base stations 22, 24 or 26 receives correctly the packets emitted by terminal 20.

Figure 5:
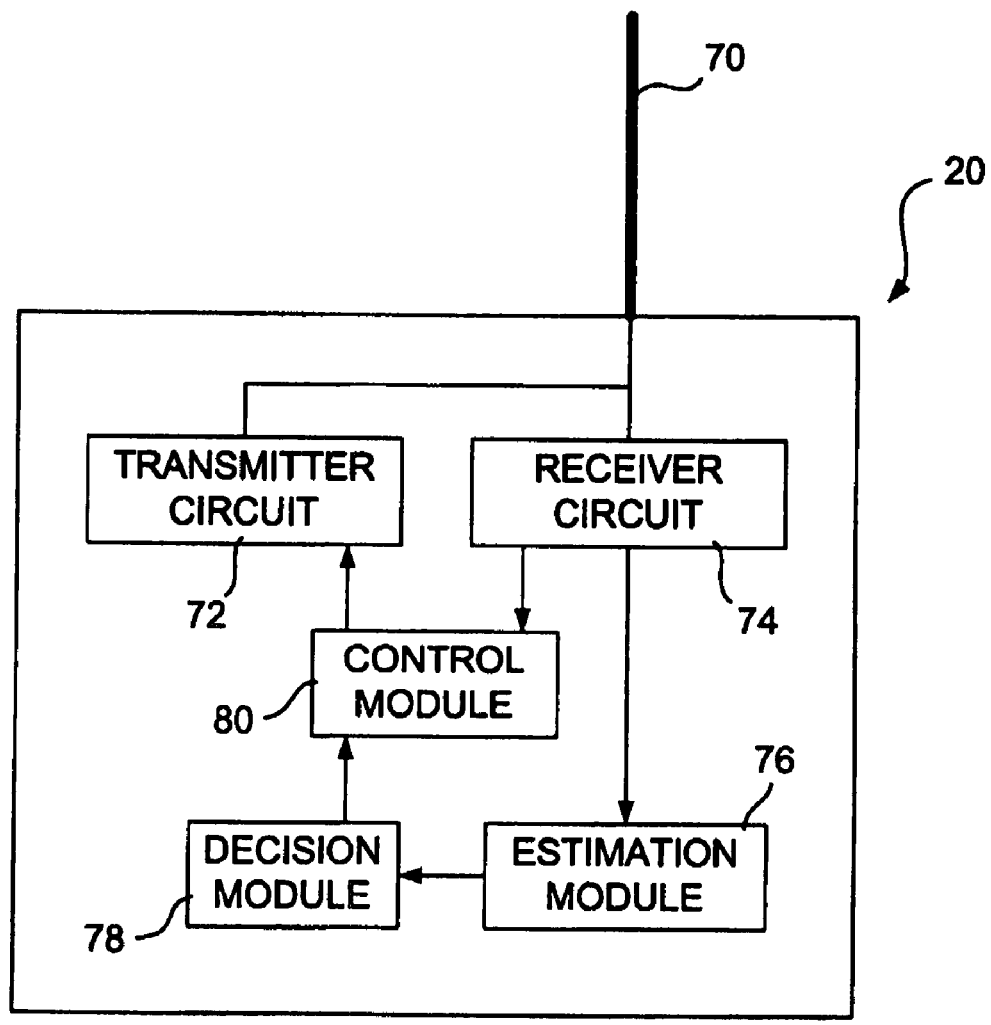
FIG. 5 is a block diagram illustrating an example of a mobile terminal according to the present invention.

An example of the constitution of terminal 20 is illustrated in FIG. 5. Terminal 20 has antenna 70 for communicating with the base stations over the air, transmitter circuit 72 connected to antenna 70, receiver circuit 74 connected to antenna 70, estimation module 76, decision module 78, and control module 80. Estimation module 76 is connected to receiver circuit 74, and arranged for estimating quality of downlink communication from each base station on the CPICH channel. Specifically, estimation module 76 receives the pilot bits/symbols transmitted via the CPICH channel from receiver circuit 74, analyzes the pilot bits/symbols, and measures the power of reception signals from the result of the analysis. Decision module 78 receives the measured power from estimation module 76, and makes the decision whether terminal 20 requests only a negative acknowledgement NACK or requests only a positive acknowledgement ACK from the base stations depending on the measured power. Control module 80 is provided for managing the synchronization process of terminal 20 with the network, and for controlling the exchanges of data packets and acknowledgement signals between terminal 20 and the base stations as described above in accordance with the result of decision in decision module 78.

The invention allows optimizing exchanges of the signals ACK and NACK between the terminal and the network, thus reducing the interferences at terminal level.

The invention claimed is:

1. A method for optimizing exchanges of acknowledgement signals between a mobile equipment in asynchronous communication with a plurality of base stations of a cellular telecommunication network by synchronizing said mobile equipment with the cellular telecommunication network, said mobile equipment sends data to said base stations and each base station is configured to return a positive acknowledgement ACK to the mobile equipment if the base station receives the data transmitted by the mobile equipment correctly, or a negative acknowledgement NACK if the data transmitted by the mobile equipment was incorrectly received by said base stations, the method comprising the steps of:

estimating quality of downlink communication between each base station and the mobile equipment on at least one channel, such that if at least one base station returns an acknowledgement to the mobile equipment, said mobile equipment only requests a negative acknowledgement NACK from said base stations for all subsequent data transmission while said estimated quality is higher than a preset value;

transmitting the data with an request for a base station to respond with a positive acknowledgement ACK or a negative acknowledgement NACK within a predetermined period of time and wherein said estimating the quality of downlink communication occurs if said positive acknowledgment ACK or said negative acknowledgment NACK is not received within said predetermined period of time; and re-transmitting said data only if the estimated quality of the at least one channel is less than the preset value for each base station or if the estimated quality of at least one channel from at least one base station is less than the preset value and all the other base stations send a negative acknowledgement NACK to the mobile equipment.

2. The method according to claim 1, wherein said network is a network based on WCDMA (Wide Code Division Multiple Access) technology.

3. The method according to claim 2, wherein said network is a UMTS (Universal Mobile Telecommunications System) network.

4. The method according to claim 3, wherein said channel is a CPICH (Common Pilot Channel) channel.

5. Mobile equipment capable of transmitting data to a plurality of base stations of a cellular telecommunication network and of receiving a positive acknowledgement ACK from a base station, if the data was correctly received by said base station, or a negative acknowledgement NACK, if the data was incorrectly received by said base station, the mobile equipment comprising:

means for estimating quality of downlink communication of each base station of the network on at least one channel;

decision making means for either only requesting a negative acknowledgement NACK or only a positive acknowledgement ACK from said base stations depending on the quality of said estimated communication channel;

means for transmitting the data with an request for a base station to respond with a positive acknowledgement ACK or a negative acknowledgement NACK within a predetermined period of time and wherein said means for estimating the quality of downlink communication estimates the quality if said positive acknowledgment ACK or said negative acknowledgment NACK is not received within said predetermined period of time; and means for re-transmitting said data only if the estimated quality of the at least one channel is less than the preset value for each base station or if the estimated quality of at least one channel from at least one base station is less than the preset value and all the other base stations send a negative acknowledgement NACK to the mobile equipment.

6. The mobile equipment of claim 5, wherein said network is a network based on WCDMA (Wide Code Division Multiple Access) technology.

7. The mobile equipment of claim 5, wherein said network is a UMTS (Universal Mobile Telecommunications System) network.

8. The mobile equipment of claim 5, wherein said channel is a CPICH (Common Pilot Channel) channel.

9. The method according to claim 1, wherein if said positive acknowledgment ACK or said negative acknowledgment NACK is not received within said predetermined period of time and if said estimated quality for said at least one channel is higher than the preset value for at least one base station, said mobile equipment transmits new data to said base stations without waiting for an acknowledgement.

* * * * *